(12) United States Patent
Bertosa et al.

(10) Patent No.: US 8,886,391 B2
(45) Date of Patent: Nov. 11, 2014

(54) METHOD AND SYSTEM FOR RETRIEVING DIAGNOSTIC INFORMATION FROM A VEHICLE

(71) Applicants: Thomas J. Bertosa, Mentor-On-The-Lake, OH (US); Robert A. Roberts, South Euclid, OH (US); Michael Gessner, Akron, OH (US); Hamid Namaky, South Russell, OH (US)

(72) Inventors: Thomas J. Bertosa, Mentor-On-The-Lake, OH (US); Robert A. Roberts, South Euclid, OH (US); Michael Gessner, Akron, OH (US); Hamid Namaky, South Russell, OH (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/797,743

(22) Filed: Mar. 12, 2013

(65) Prior Publication Data
US 2013/0197741 A1    Aug. 1, 2013

Related U.S. Application Data

(62) Division of application No. 11/024,452, filed on Dec. 30, 2004, now Pat. No. 8,412,401.

(51) Int. Cl.
| | |
|---|---|
| B60Q 1/00 | (2006.01) |
| G06F 17/00 | (2006.01) |
| G06F 19/00 | (2011.01) |
| G01M 17/00 | (2006.01) |

(52) U.S. Cl.
USPC .......... 701/29.1; 701/34.2; 307/10.1; 340/438

(58) Field of Classification Search
USPC ............... 701/1, 29.1, 29.2, 29.3, 29.6, 31.4, 701/31.5, 33.2, 34.2; 307/9.1, 10.1; 340/425.5, 438, 439
See application file for complete search history.

(56) References Cited

U.S. PATENT DOCUMENTS

| | | |
|---|---|---|
| 5,452,446 A | 9/1995 | Johnson |
| 5,541,840 A * | 7/1996 | Gurne et al. ................. 701/29.3 |
| 6,181,992 B1 | 1/2001 | Gurne et al. |
| 6,384,608 B1 | 5/2002 | Namaky |
| 6,388,448 B1 | 5/2002 | Cervas |
| 6,388,488 B1 | 5/2002 | Ho |
| 6,529,808 B1 | 3/2003 | Diem |

(Continued)

OTHER PUBLICATIONS

Society of Automotive Engineers, Inc., "Surface Vehicle Recommended Practice" (OBD II Scan Tool), Appendix 1, issued Mar. 1992 and revised Feb. 1998, whole document.

(Continued)

*Primary Examiner* — Thomas Tarcza
*Assistant Examiner* — Edward Pipala
(74) *Attorney, Agent, or Firm* — Baker & Hostetler LLP

(57) ABSTRACT

Exemplary embodiments of off-board tools (OBTs) may be used in vehicle inspection maintenance programs are provided. The OBT may include a processor, vehicle communication circuitry for linking to a vehicle diagnostic system, host interface circuitry for communicating with a host computer, and voltage determination circuitry for measuring a voltage through the vehicle diagnostic system. The OBT may include logic for storing a communications protocol used to link with a vehicle diagnostic system that is preferably used for re-establishing dropped communications links. In addition, the OBT may contain logic for testing at least one component of a starting and/or charging system of a vehicle. Still other embodiments may include logic for sending unsolicited messages to a host computer. Additional embodiments may include logic for determining the minimum number of messages that must be received by an OBT.

21 Claims, 7 Drawing Sheets

(56) References Cited

U.S. PATENT DOCUMENTS

| | | | |
|---|---|---|---|
| 6,570,385 | B1 | 5/2003 | Roberts et al. |
| 6,604,033 | B1 | 8/2003 | Banet et al. |
| 6,611,740 | B2 | 8/2003 | Lowrey et al. |
| 6,701,233 | B2 | 3/2004 | Namaky et al. |
| 6,732,032 | B1 | 5/2004 | Banet et al. |
| 6,947,816 | B2 | 9/2005 | Chen |
| 7,437,227 | B2 | 10/2008 | Andreasen et al. |
| 2004/0054503 | A1 | 3/2004 | Namaky |
| 2006/0027650 | A1* | 2/2006 | Andreasen et al. ........... 235/384 |

OTHER PUBLICATIONS

Society of Automotive Engineers, Inc., "Surface Vehicle Recommended Practice" (E/E Diagnostic Test M<odes), Appendix 2, issued Dec. 1991 and revised Sep. 1997, whole document.

SAE J1978 Revised FEB 98—Section 6.4.1 and 6.4.2—pp. 5 and 6.

SAE—Surface Vehicle Recommended Practice—OBD II Scan Tool Equivalent to ISO/DIS 15031-4:Dec. 14, 2001-Revised.

* cited by examiner

METHOD AND SYSTEM FOR RETRIEVING DIAGNOSTIC INFORMATION FROM A VEHICLE

CROSS-REFERENCE TO RELATED APPLICATIONS

This application is a Divisional of U.S. patent application Ser. No. 11/024,452, filed Dec. 30, 2004, now U.S. Pat. No. 8,412,401 the disclosure of which is incorporated by reference in its entirety.

FIELD OF THE INVENTION

The present invention relates generally to the field of electronic testing devices, and more specifically to "off-board devices," such as inspection maintenance tools, scan tools, and code readers.

BACKGROUND OF THE INVENTION

The Environmental Protection Agency (EPA) sets guidelines for states to follow in designing and running vehicle inspection and maintenance (I/M) programs. The guidelines are designed to reduce pollutants in the air that are produced by vehicles having defective or improperly working emissions systems. The guidelines for automobile emissions testing programs set forth the minimum requirements to satisfy the Clean Air Act (CAA). One requirement is that the states periodically inspect vehicles that travel on the roadways. Included in the periodic inspection for newer vehicles is the checking of the vehicles on-board diagnostic system.

Vehicle emission inspection programs have traditionally analyzed vehicle exhaust under simulated driving conditions. One way to simulate driving conditions is to place the vehicle on rollers and run the vehicle at various speeds. Placing the vehicle on rollers and running the vehicle at selected speeds is undesirable because it is inconvenient, time consuming, and potentially dangerous.

Another method of performing a vehicle emissions inspection is to analyze the data stored on the on-board diagnostic system that was gathered during actual driving conditions. All vehicles manufactured since 1996 are required to have an on-board diagnostic system. The on-board diagnostic system includes one or more computer modules that are used to control various components, such as the engine and transmission. In addition, the on-board diagnostic systems monitor and store data indicative of emissions levels, such as, for example, data from oxygen sensors, the catalytic converter, the EGR valve, etc., that are obtained during actual driving conditions over a period of time and during key off conditions. The on-board diagnostic system sets a status flag to ensure that the vehicle has been driven under actual conditions for a sufficient period of time for the on-board diagnostic system to fully evaluate the emissions system. The status flag, or readiness code, is used to verify that error codes have not been cleared immediately prior to having the vehicle inspected.

A typical I/M program for 1996 and later models may include a manual examination of the emission system components and an electronic examination of the on-board diagnostic system. First, the inspector performs a visual check of the dashboard display, status indication, (or the malfunction indicator light "MIL") and the selected emissions control components. Next, the inspector performs an inspection of the on-board diagnostic system. Typically, an "Off-Board Tool," (OBT) such as a scan tool, code reader or similar hand-held instrument is used to extract data from the vehicle on-board diagnostic system in the form of Diagnostic Trouble Codes (DTCs), monitors, etc.

"Off-Board Tools," (OBTs) such as, for example, scan tools, are testing devices that interface with vehicle diagnostic systems to access, display, and/or print vehicle diagnostic information. On-Board Diagnostics Version II Scan Tools are one commonly known type of scan tool and are governed by a number of standards, such as, for example, SAE J1978 Rev. APR 2002 and SAE J1979 Rev. APR 2002.

There are a number of problems with existing OBTs when used for emissions testing programs. in order to be On-Board Diagnostics Version-II compliant, existing OBTs must automatically determine the proper communications protocol to use to connect to the vehicle. OBTs cannot acquire the communications protocol from a user, or host computer and remain On-Board Diagnostics Version-II compliant. Determining the proper protocol and establishing the communications link following the SAE standards requires a significant amount of time. In the event that the communications link between the OBT and the on-board diagnostic system drops out, under the SAE standards, the OUT must re-establish the link using the same process that the OBT used to establish the link in the first place.

Moreover, dropping the communications link is not uncommon and is particularly problematic in some vehicles. In certain vehicles, such as, for example, various model years of HYUNDAI, VW, DODGE, and VOLVO vehicles, many scan tools experience communications drop-outs quite often. The user will be using a scan tool and be examining, for example, 28 different parameters, one minute and suddenly there is no response for all but, for example, three of the parameters. This often occurs when one or more controllers, such as, the engine controller, which is typically the main On-Board Diagnostics Version-II controller, has dropped out, leaving only a secondary controller, such as, a transmission controller, talking with the OBT. As a result, the OBT must begin the entire session over again, which can take half a minute or more.

As noted above, under SAE specifications, protocol determination is an automatic (hands off) determination of the communication protocol the vehicle uses to support the On-Board Diagnostics Version-II functions. Some vehicles have multiple modules and these modules often use different communication protocols. Only one of these protocols, however, is used to obtain all of the On-Board Diagnostics Version-II information for the vehicle. Therefore, the OBT must be able to determine Which protocol is the correct one to use for On-Board Diagnostics Version-II purposes. Section 6.4.1 and 6.4.2 the SAE J1978 spell out a procedure for trying four (4) or more protocols and determining which one is the On-Board Diagnostics Version-II protocol supported by the vehicle related to the appropriate functions. Although the specification requires that only one protocol be allowed to be used in any one vehicle to access all the supported On-Board Diagnostics Version-II functions, it does not mean than the vehicle cannot support more that one protocol. It only means that one protocol can be used as the On-Board Diagnostics Version-II link. Occasionally following the SAE specifications for determining the proper protocol results in using the wrong protocol, i.e. one that does not provide the most relevant information (e.g., the most emissions information). Problem vehicles include, for example, ones that supports both ISO 9141-2 (ISO) and ISO 14230-4 (Keyword 2000). In this example, the engine control module uses ISO 14230-4 as its protocol and the transmission control module uses ISO 9141-2. The engine controller is the module that supports the On-Board Diagnostics Version-II functions for the vehicle. But the SAE suggested procedure directs that the OBT test for ISO 9141-2 first and if one receives a reply, then that is the protocol to use for the link. This causes the OBT to incorrectly choose the protocol being used by the transmission as the On-Board Diagnostics Version-II protocol for this type of vehicle rather than the protocol being used by the engine controller. Now that the OBT is using the wrong protocol, ISO 9141-2, it is only talking to the transmission controller. The engine controller (and all the emissions information it has to offer) is not found. This type of problem can happen in other protocol combinations as well. Thus, under this same procedure, an OBT might select a protocol that ends up with far less emissions data than another protocol.

In addition, some vehicles employ multiple modules that communicate using the same protocol. This type of system is subject to one or more of the modules to losing their active communication with an OBT. If the OBT does not realize that one or more of the modules has dropped the link, it will not be showing complete/correct data. For example, certain VW models that use an engine control module and a transmission control module present a problem. After determining the On-Board Diagnostics Version-II protocol and initializing both modules for communications one or the other module occasionally stops communicating. This problem can be seen while requesting information on several functions, such as the "View Data" function (also known as the "Live Data" function). For example, a user might notice during one View Data session that two modules report the state of the "MIL" and might notice on a subsequent View Data session on the same vehicle that only one module reports the MIL's state. The MIL's state from the other modules is now unknown. What happened is that, unknown to the user, one of the controllers dropped the communications link, so it did not respond to the request for the state of the MIL. These problems can result in information being misreported.

In addition, existing OBTs waste significant amounts of time during diagnostic test modes. Modern vehicles support a number of diagnostic test modes, such as Modes 01-09. Mode 01 is used to Request Current Powertrain Diagnostic Data, Mode 02 is used to Request Powertrain Freeze Frame Data, Mode 03 is used to Request Emission-Related Powertrain Diagnostic Trouble Codes (DTCs), Mode 04 is used to Clear/Reset Emission-Related Diagnostic Information, Mode 05 is used to Request Oxygen Sensor Monitoring Test Results, Mode 06 is used to Request on-Board Monitoring Test Results for Non-Continuously Monitored Systems, Mode 07 is used to Request On-Board Monitoring Test results for Continuously Monitored Systems, Mode 08 is used to Request Control of On-Board System, Tests, or Component, and Mode 09 is used to Request Vehicle Information.

Under the recommended practices developed by SAE, an OBT should wait for a response from the previous request, or "no response" timeout before sending another request. Significant amounts of time are wasted during test modes, such as, for example, a Mode 9 request, while the OBT waits to see if the on-board vehicle diagnostic system is going to send additional messages after the on-board vehicle diagnostic system has already sent all of its messages. Each communications protocol, such as, for example, J1850 PWM, J1850 VPW, ISO 9141-2, ISO 14230-4 and ISO 15765-4 has a different time out requirement and thus, the length of time or the "no response" timeout varies based on the communications protocol being used. Time out requirements are the length of time that a computer module has to respond to a request by the OBT.

Although, an OBT can initiate a request to the vehicle diagnostic system that should identify the number of computer modules that support the request, and the number of messages that each computer module will provide, the response is often incomplete or inaccurate. Often times, for example, a computer module will indicate that it has a certain number of messages, but will respond to a request with more than the indicated number of messages. Problems arise, for example, if an OBT is expecting two messages, one from a first computer module, and one from a second computer module, and the ORT stops waiting for responses after it receives two messages, even though both of the messages were actually from the second computer module. Thus, the OBT never receives the response from the first computer module.

SUMMARY OF THE INVENTION

Exemplary embodiments of off-board tools (OBTs) that may be used in vehicle inspection maintenance programs are provided. The OBT may include a processor, vehicle communication circuitry for linking to a vehicle diagnostic system, host interface circuitry for communicating with a host computer, and voltage determination circuitry for measuring a voltage through the vehicle diagnostic system. The OBT may include logic for storing a communications protocol used to link with a vehicle diagnostic system that is preferably used for re-establishing dropped communications links. In addition, the OBT may contain logic for testing at least one component of a starting and/or charging system of a vehicle. Still other embodiments may include logic for sending unsolicited messages to a host computer. Additional embodiments may include logic for determining the minimum number of messages that must be received by an OBT.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify principles of this invention, wherein.

DETAILED DESCRIPTION OF THE INVENTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Software" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Figure 1:
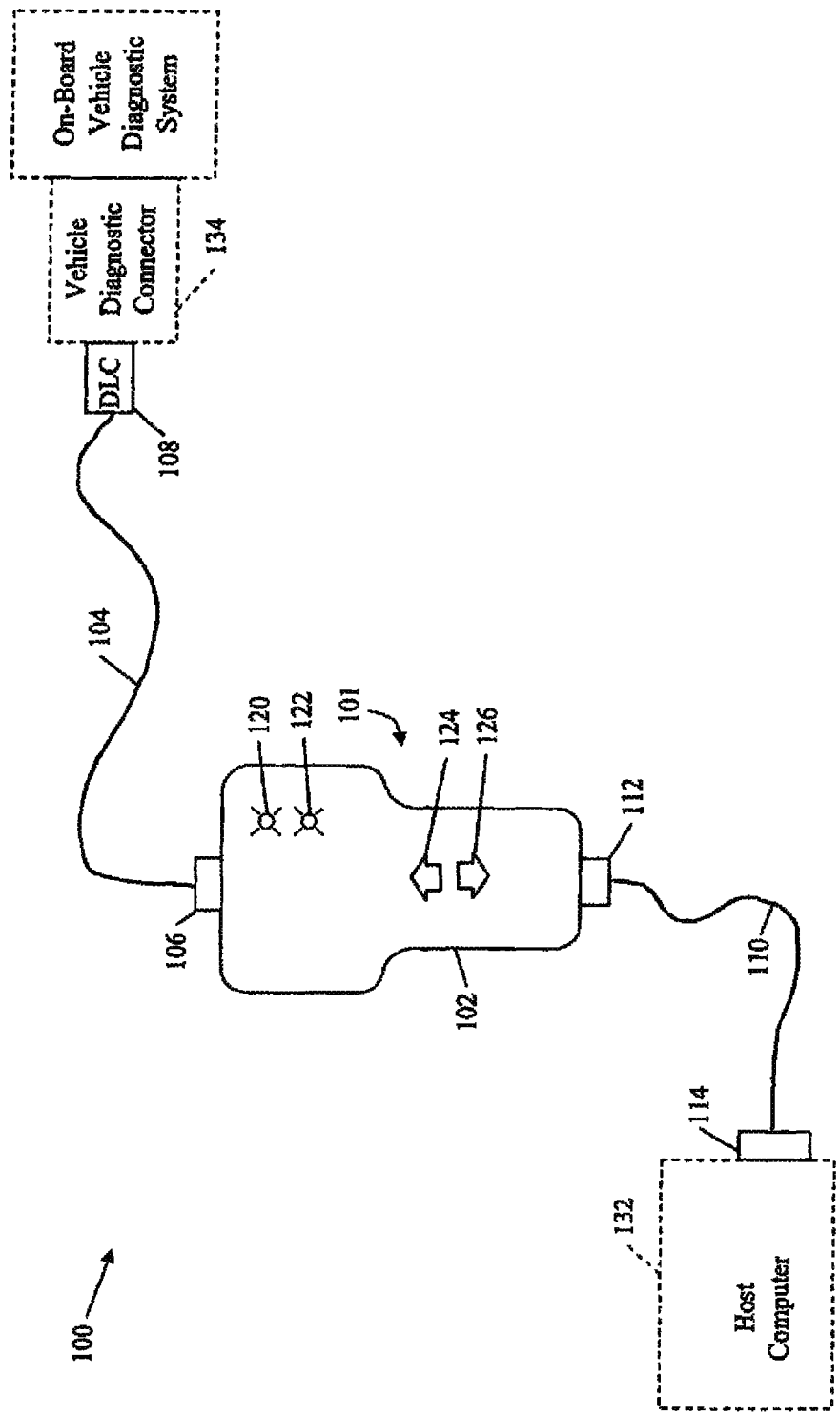
FIG. 1 is a high-level block diagram of an exemplary embodiment of an OBT connected to a host computer and a vehicle on-board diagnostic system.

FIG. 1 illustrates an exemplary system 100 for retrieving data from an on-board diagnostic system. The exemplary system 100 is configured. to retrieve vehicle emissions data, and is optionally configured to communicate with a host computer 132 in conjunction with an I/M program. The exemplary system 100 includes an OBT 101, and a pair of cables 104 and 110. Cable 104 is used to selectively place OBT 101 in circuit communication with the vehicle on-board diagnostic system through vehicle diagnostic connector 134. Similarly, cable 110 is used to selectively place the OBT 101 in circuit communication with host computer 132.

Cable 104 includes a first connector 108, which may be a Data Link Connector (DLC), such as for example a J1692 connector, and a second connector 106. Second connector 106 can be virtually any type of connector and may be releasably connectable to the OBT 101. Cables 104 and 110 may both be releasably connectable, or detachable, so that the cables can be easily replaced if damaged, or removed from the OBT 101 for storage. Optionally, cable 104 can be replaced with wireless transmitters and receivers. In such a case, wireless communication circuitry is connected to the on-board diagnostic system. The wireless communication circuitry may be removably connectable to the vehicle diagnostic connector 134. However, optionally, wireless communication circuitry can be permanently installed in the vehicle and accessed remotely by OBT 101.

Cable 110 may have a first connector 112, for releasably connecting to the OBT 101, and a second connector 114 tor releasably connecting to a host computer 114. Connectors 112 and 114 can be virtually any type of connector, such as, for example, serial port connectors. Similarly to that described above, optionally, cable 110 can be replaced with wireless communication circuitry.

OBT 101 includes a housing 102 and a user interface, which may include, an "up" arrow key 124, a "down" arrow key 126, a first LED 120, and a second LED 122, Optionally key 124 is a "Y" or yes key and key 126 is a "N" or no key. The "up" arrow 124 key and "down" arrow key 126 may be used to scroll through displays, and acknowledge prompts provided on a remote monitor (not shown) that may be controlled by the host computer 132. The first LED 120 may have at least three states, i.e. "red", "green" and "off. " The second LED 122 may have at least two states, "yellow" and "off." Various combinations of the states are used to indicate different status information, such as, for example: LED 120 "off" and LED 122 "off" may indicate that the tool is not connected to the vehicle or there is no voltage present at pin 16. LED 120 "red," LED 122 "off" may indicate that the tool is properly connected but the voltage is below the minimum voltage required to power the microprocessor such as, for example, below about 6 volts. LED 120 "green" LED 122 "off" may indicate that the battery voltage is sufficient to power the microprocessor, but there is a problem with OBT 101, such as, for example, the code is not executing properly; LED 120 "green" LED 120 "yellow" may indicate that the voltage is at or above the minimum required by the SAE specifications, such as, for example, 8 volts and that the tool is operating normally, optionally LED 122 blinks "yellow/off" to indicate the OBT is communicating with the host computer; LED 120 "red" LED 122 "yellow" may indicate that the voltage is below the minimum voltage required by the SAE specifications and that there is a problem with the vehicle; and LED 120 blinking "green/off," and LED 122 "off" may indicate that the OBT has power, the code is executing, but there is no communication with the host computer. Optionally, OBT 101 receives power from the host computer allowing a determination to be made on whether the OBT 101 is functioning properly. The power from the host is using the power the LED's to provide a status output.

Figure 2A:
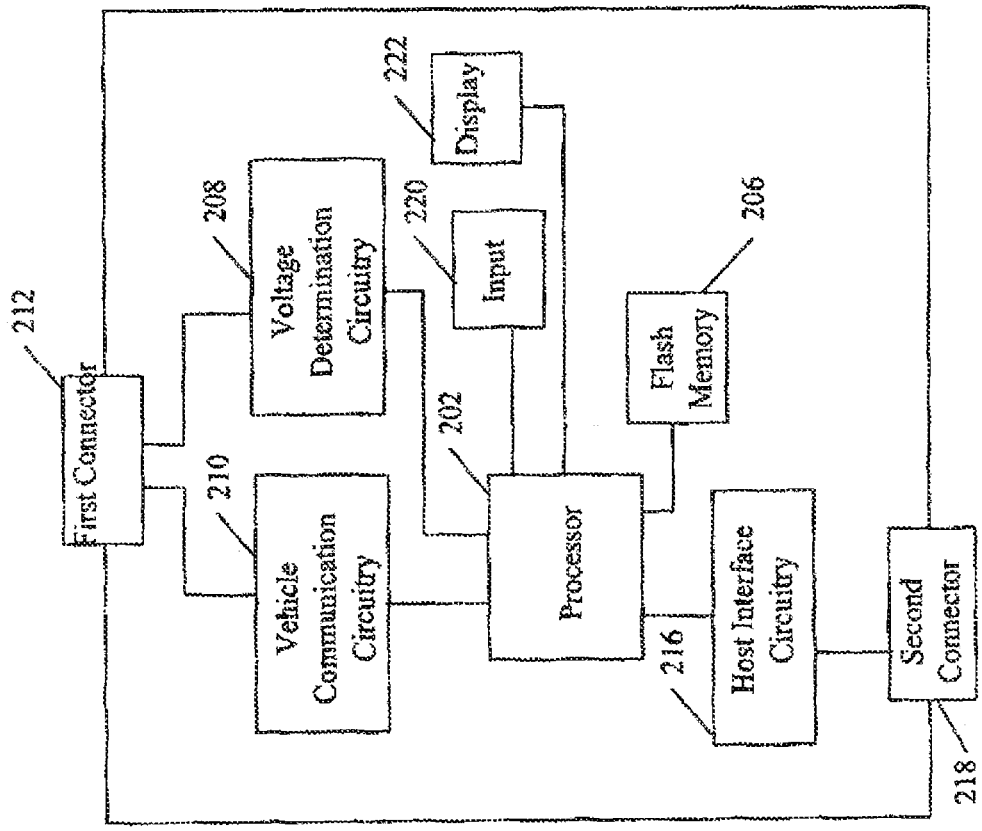
FIG. 2A is a high-level block diagram of an exemplary embodiment of circuitry for an OBT.
Figure 2B:
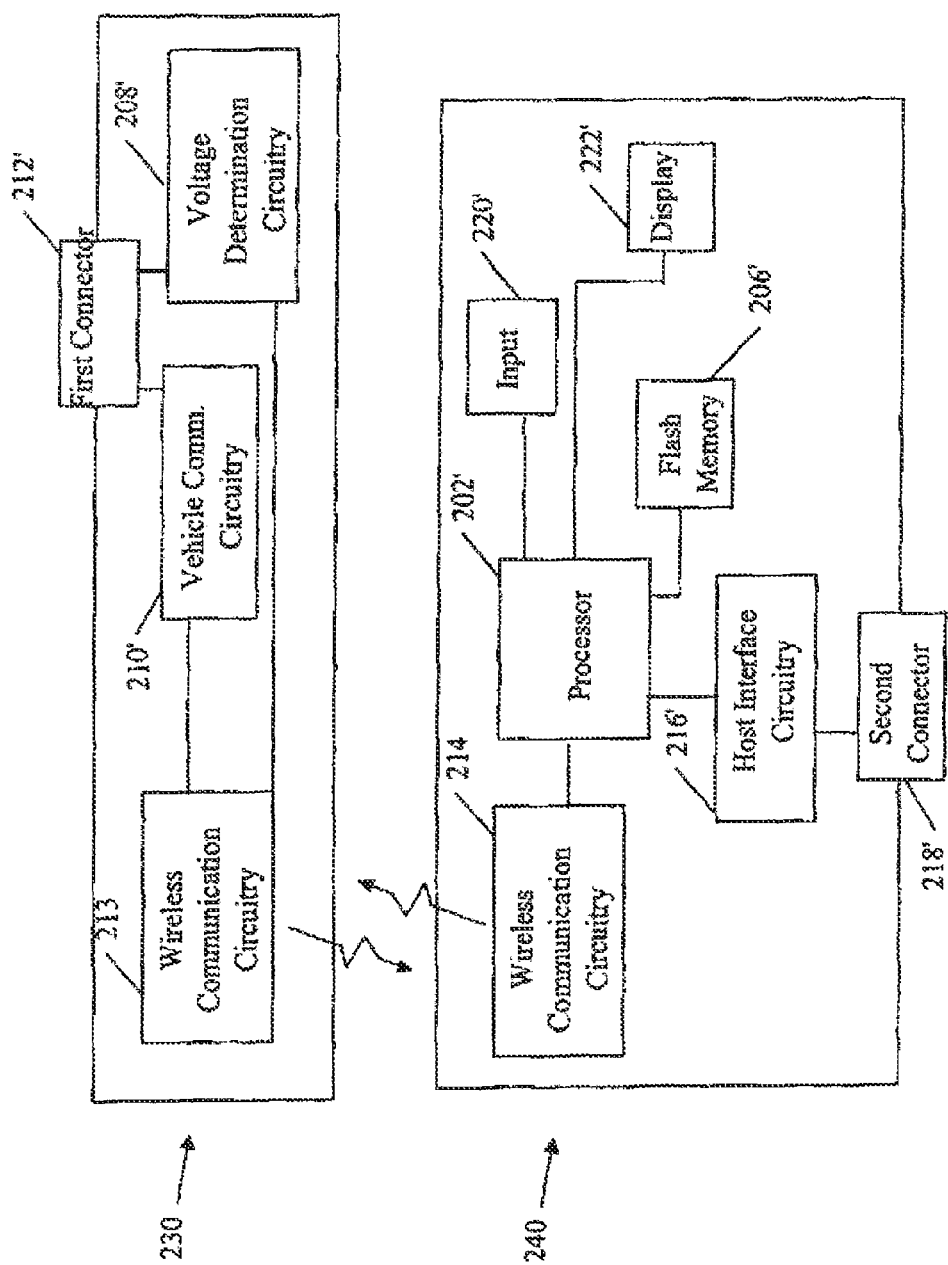
FIG. 2B is a high-level block diagram of an exemplary embodiment of circuitry for an OBT.

FIG. 2A illustrates an exemplary embodiment of an off-board tool, OBT 200. OBT 200 includes a processor 202 in circuit communication with voltage determination circuitry 208, vehicle communication circuitry 210, and host interface circuitry 216. In addition, OBT 200 may include a first connector 212 in circuit communication with the vehicle communication circuitry 210 and voltage determination circuitry 208. First connector 212 provides a releasable connection point for a cable (104 in FIG. 1) for selectively placing OBT 200 in circuit communication with a on-board diagnostic system preferably through the vehicle data link connector. Optionally, first connector 212 can be replaced with wireless communication circuitry for receiving data from the vehicle on-board diagnostic system, see also, FIG. 2B. OBT 200 may include a second connector 218 in circuit communication with the host interface circuitry 216. Optionally, the second connector 218 can be in direct communication with the processor 202, and the host interface circuitry 216 can be located in or near the host computer (132 in FIG. 1). Still optionally, OBT 200 can contain wireless communication circuitry (not shown) for communicating with the host computer, and thus, eliminating the need for second connector 218.

OBT 200 preferably also includes flash memory 206 such as, for example, Micron Part No. AM29F002NBT or MT28F800B5-SG8T, in circuit communication with the processor 202. The flash memory 206 is used to store software for causing the processor to perform the OBT functions and may also store other information pertinent to operation of the OBT 200. Preferably, the flash memory 206 can be updated or reprogrammed via the host computer through either the first or second connectors 212, 218. Optionally, the flash memory 206 is updated or reprogrammed through a DLC connector (not shown) in circuit communication with the OBT 200 without requiring the removal of a cable connected to the off-board device, or in an alternative situation where the cable is hard wired to the OBT, i.e. where there is no first connector 212.

In addition, OBT 200 may also include input circuitry 220 and display circuitry 222 in circuit communication with the processor 212. The input 220 can be any type of input, such as for example any one or more of the following: a touch screen, push buttons, selector switches, etc. In one exemplary embodiment, input 220 includes one or more arrow keys, such as, for example, the "up" arrow key and "down" arrow key described above. Optionally a yes key and a no key are used, in addition, display 222 can be any type of display, such as, for example any one or more of the following: a liquid crystal display, binary displays, such as LEDs, textual displays, such as n character by m line LCD or plasma displays, etc. In one exemplary embodiment, the display includes 2 LEDs, for providing operator feedback, such as, for example, vehicle battery voltage, the health of the off-board device, and the transmission of data to and from the vehicle.

The processor 202, also referred to herein as processor circuit 202, may be one of virtually any number of processor systems and/or stand-alone processors, such as microprocessors, microcontrollers, and digital signal processors, and may have associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit. The exemplary OBT of FIG. 2A may be implemented using an MC68306 processor.

The processor 202 typically executes a computer program or code stored in its RAM, ROM, its EPROM (all not shown) and/or Flash memory 206, using data stored in any one or more of those memories. For example, the processor 202 may execute a computer program from a ROM (not shown) using data (e.g., codes) stored in Flash memory 206. In general, the computer program executed by the processor 202 initializes the OBT 200 and generates a user interface, for example, using the input device(s) 220 through which a user causes the OBT 200 to communicate with the vehicle on-board diagnostic system to read certain data from the vehicle on-board diagnostic system, format such read data, and display the formatted data on the display 222 or communicate the data to a host computer (FIG. 1). Optionally, the computer program executed by the processor 202 initializes the OBT 200 and generates a user interface with the host computer, allowing host computer to request data via OBT 200 from the vehicle on-board diagnostic system with or without actions by the user.

The voltage determination circuitry 208 may be used to determine the voltage at pin 16 of the data link connector. When the engine is off, this may correlate with or be indicative of the battery voltage. Optionally, the voltage determination circuitry 208 may include circuitry for performing other tests on the battery, the starting system and/or the charging systems. Voltage determination circuitry 208 may be virtually any voltage determination circuitry capable of at least measuring a battery voltage including, but not limited to, the circuitry described in Applicant's U.S. Pat. No. 6,384,608 "Battery Tester Using Internal Resistance to Measure a Condition of a Battery," U.S. Pat. No. 6,570,385 "Handheld Tester for Starting/Charging Systems," U.S. Pat. No. 6,388,488 "Electronic Battery Tester with Normal/Cold Test Modes and Terminal Connection Detection," and/or U.S. publication 2004/0054503, "Combined off-Board device and Starter/Charging/Battery System Tester," which are all incorporated by reference herein in their entirety.

In newer model vehicles, Pin No. 16 of the DLC connector (SAE J1962) is in circuit communication with the positive battery terminal. Pin No.s 4 and 5 are connected to the vehicle ground, which is in circuit communication with the negative battery terminal. Using pins No. 4 and/or 5 and No. 16 to monitor the voltage indicative of voltage across the battery allows a OBT 200 to perform charging system tests and starting system tests similar to that described in patents above that are incorporated herein, In addition, preferably the OBT 200 uses the vehicle battery to provide power to the OBT 200.

The voltage determination circuitry 208 measures the voltage across pins 16 and 4. As described above, the voltage may be used to provide an indication of numerous parameters, e.g., whether the OBT is functioning properly, whether the vehicle battery has sufficient power to power the processor 202, whether the voltage meets or exceeds the requirements set forth by SAE, whether the OBT is communicating with the host computer, and whether a problem with the car exists.

The vehicle communication circuitry 210 is used to facilitate generating one or more communications protocols with which the OBT 200 and the on-board diagnostic system communicate with one-another. The vehicle communication circuitry 208 can be implemented either in hardware, or in software, or in a combination of hardware and software. Typical communications protocols generated by the vehicle communication circuitry 208 include, but are not limited to: SAE 31850 (VFW), SAE J1850 (PWM), ISO 9141-2, ISO 14230-4, and ISO 15765-4. The present invention is not intended to be limited to any specific protocol, however, or even to electrical communications protocols. Other present and future protocols, such as fiber optic and wireless communications protocols are also contemplated as being within the sprit and scope of various embodiments of the present invention.

When connected to the vehicle on-board diagnostic system, the OBT 200 establishes a communications link with the on-board diagnostic system using virtually any interface method, such as for example, one of those discussed in Applicants U.S. Pat. No. 6,701,233, "Scan Tool with Dropped Communications Detection and Recovery and Improved Protocol Selection," which is incorporated by reference herein in it's entirety.

Optionally, OBT 200 establishes a communications link with the on-board diagnostic system via an externally selected communications protocol. The externally selected communications protocol may be supplied by the host computer. Optionally, the externally selected communications protocol may be supplied by a user. Still yet, the externally selected communication protocol may reside in the OBT 200 and be selected by communicating vehicle type information, such as, for example, the VIN number to the OBT 200. Linking between OBT 200 and the vehicle using a externally selected protocol is particularly useful for "problem vehicles," such as for example, certain VW models that tend to establish communications with off-board devices using the wrong communications protocol. "Problem vehicles" as used herein is used generally, and includes but, is not limited to, vehicles that establish a communication link with an OBT that is not the preferred communications protocol for obtaining the desired information. Problem vehicles can be vehicles that routinely link using a less desirable communications protocol, or occasionally link using the less desirable communications protocol. As described in more detail below, in one exemplary embodiment, a list of "problem vehicles" is created and a selected communications protocol is associated with each problem vehicle. During a test, the vehicle type is identified, and if the vehicle type is a "problem vehicle," the OBT 200 is directed to link to the vehicle using the selected communications protocol that is associated with the vehicle. The list of problem vehicles and associated communications protocols can be stored in a host computer, or in the OBT 200. Identifying the type of vehicle is accomplished in any manner, such as for example, manually entering the vehicle type in the host computer, or in the OBT 200, or scanning the vehicle identification number. Scanning the vehicle identification into the computer can be accomplished by, for example, a bar code reader. The bar code reader can be separate from the OBT 200 or integral with the OBT.

Optionally, a comprehensive list of vehicles, or vehicle families, is stored in the host computer, or in the OBT 200. A comprehensive list of vehicles, includes, but is not limited to, a list that has many types of vehicles or families of vehicles, and does not need to include all vehicles or families of vehicles. The comprehensive list is preferably created by developing a list of vehicles and associating a communications protocol with each vehicle based on the manufacture's specifications. The comprehensive list of vehicles or vehicle families is used to select the desired communications protocol to link with that particular vehicle, or family of vehicles. As described above, the type of vehicle being tested can be identified in virtually any manner. Upon identifying the type of vehicle being tested, the OBT is instructed to link to the on-board diagnostic system using a selected communication protocol that corresponds to the vehicle or family of vehicles. This method eliminates any need for the OBT 200 to automatically select the communications protocol.

Once the OBT 200 establishes a communications link with the vehicle using a particular communications protocol, the OBT 200 communicates that communications protocol to the host computer. If the established communications link fails by, for example, a computer module dropping out, or by a break in the connection between the vehicle and the OBT 200, the OBT 200 re-establishes the communications link using the previously selected communications protocol. Re-establishing the communications link using this method as described in more detail below saves time which is beneficial for use in, for example, I/M testing programs.

Host interface circuitry 216 facilitates communications between the OBT 200 and the host computer 132 (FIG. 1). Host interface circuitry 216 can be implemented either in hardware, or in software, or in a combination of hardware and software. The present invention is not intended to be limited to any specific protocol, or even to electrical communications protocols. Other present and future protocols, such as fiber optic and wireless communications protocols, are also contemplated as being within the spirit and scope of various embodiments of the present invention.

The host interface circuitry 216 includes an associated dynamic link library (DLL) for interfacing with the host computer software. Preferably, a DLL resides in memory located in the host computer. Optionally, a device driver rather than a DLL resides in the memory located in the host computer to manage interactions with the OBT. Creating and using a DLL or device driver allows the OBT software parameters and functions to be updated and/or changed without requiring the update of or interference with, the host computer software. This is particularly useful in certain situations, such as I/M programs where one vendor is responsible for the OBT and another vendor is responsible for the programming and software used in the host computer.

In addition, providing a DLL allows the entire OBT to be replaced with a different type of OBT, such as, for example, a stripped down OBT that does not have a display or advanced diagnostic technologies can be connected to the host computer and used to retrieve data, or optionally, an OBT having advanced diagnostic technologies and a full display can be connected to the host computer and used to retrieve data. The DLL allows either tool to be connected to the host computer and used without modifying the host software, or even alerting the host computer of the different type of OBT being used.

The display 222 can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. In one embodiment, the display 222 includes one or more LED(s). In addition, the input device(s) 220 can be one or more of virtually any type of input device, such as, for example, a keyboard, touch screen, etc. In one embodiment, the input device(s) 220 is one or more keys such as a "yes" and a "no" key.

FIG. 28 illustrates an exemplary embodiment of an OBT having wireless communications circuitry. The OBT includes a vehicle interface unit 230 and a remote unit 240. The vehicle, interface unit 230 includes a first connector 212', in circuit communication with vehicle communications circuitry 210', voltage determination circuitry 208' and wireless communication circuitry 213. Many of the components illustrated in the exemplary embodiment are similar to those described above and those components are identified using a "'" designation. Vehicle interface unit 230 is connectable to the vehicle diagnostic system via the diagnostic connector. Optionally the vehicle interface unit 230 is permanently connected to the vehicle diagnostic system.

Remote unit 240 includes wireless communication circuitry 214 in circuit communication with processor 202', input 220', display 222', host interface circuitry 216', flash memory 206', second connector 218'. The wireless communication circuitry 214 allows the remote unit 240 to communicate with the vehicle interface unit 230 via the wireless communication circuitry 213, 214. The remaining components interact in substantially the same manlier as described above.

FIGS. 3-6 illustrates exemplary methodologies for novel aspects of an exemplary OBT. The blocks shown represent functions, actions or events performed therein. If embodied in software, each block may represent a module, segment or portion of code that comprises one or more executable instructions to implement the specified logical function(s). If embodied in hardware, each block may represent one or more circuits or other electronic devices to implement the specified logical function(s). It will be appreciated that computer software applications involve dynamic and flexible processes such that the functions, actions or events performed by the software and/or the hardware can be performed in other sequences different than the one shown.

Figure 3:
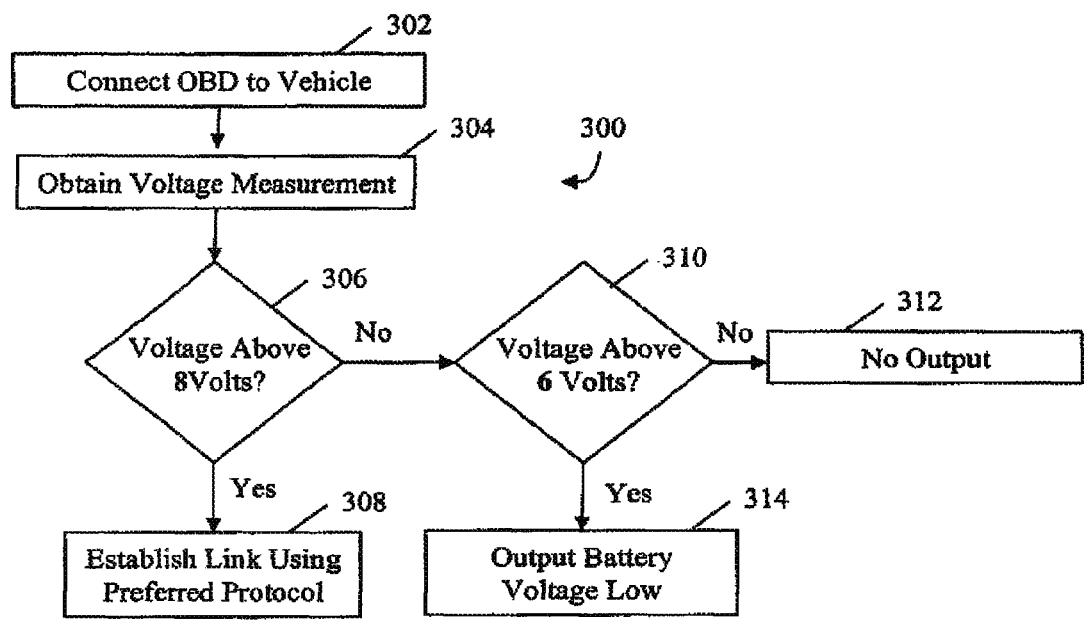
FIGS. 3-7 are flowcharts illustrating exemplary methodologies for exemplary embodiments of an OBT.

FIG. 3 illustrates an exemplary methodology of determining whether the battery of the vehicle under test is sufficiently charged to power an OBT and provide correct/complete responses to requests by the OBT for an I/M test. Checking the battery voltage prior to attempting to retrieve data from the on-board diagnostic system allows the OBT to ensure that the OBT is correctly connected, functioning properly and that the information received from the on-board diagnostic system will be complete and/or accurate. In this exemplary methodology, the OBT is connected to the vehicle at block 302. The OBT is connected to the vehicle on-board diagnostic system via a suitable cable or other communications medium, such as, for example, fiber optic or a wireless medium. At block

304, the OBT powers up and obtains a measurement of a desired voltage. The voltage may be obtained by measuring the voltage between, for example, pin 4, which is the vehicle ground, and pin 16, which is indicative of the vehicle battery voltage. At block 306 the voltage is compared to a threshold voltage, which may be a voltage between about 8 volts and 18 volts, such as, for example 8 volts. if the voltage is above the threshold voltage, the test continues and the OBT establishes a link with the vehicle using a protocol at block 308. Optionally, if the voltage is below the threshold voltage another determination is made at block 310 as to whether the voltage is above a second threshold voltage of, for example, 6 volts, the OBT outputs a voltage low signal at block 314. The voltage low signal can be any signal to communicate to the user, or host computer that the voltage is low, such as, for example, illuminating an LED. The voltage low signal indicates that there is enough power to power the processor, however, the voltage is not high enough to comply with SAE testing standards. If the voltage is below the second threshold voltage at block 310, the OBT does not provide an output.

Figure 4:
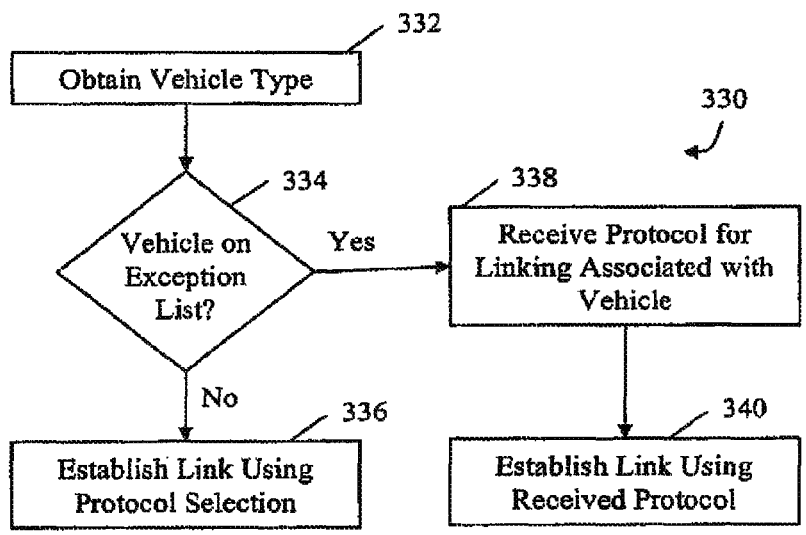

FIG. 4 illustrates an exemplary methodology of establishing a communications link with a vehicle. The methodology begins at block 332 where the vehicle type is obtained. The vehicle type can be obtained by an operator typing in the vehicle type or selecting the vehicle type from a list. Optionally, the vehicle type is obtained by scanning or automatically reading in the vehicle identification number (VIN) and using the VIN to identify the vehicle type. At block 334, the vehicle type is compared to a vehicle type "exceptions list." The "exceptions list" may be created by identifying vehicles that standard scan tools and code readers have difficulty in determining the proper communications to use to link with the vehicle, or often or occasionally link to the vehicle with an improper communications protocol. The "exceptions list" is preferably stored in the host computer. A preferred communication protocol is associated with each vehicle, or type of vehicle, on the "exceptions list." If at block 334, the vehicle type is not on the exceptions list, the OBT establishes a communications link with the vehicle using any method of automatically establishing a communications link at block 336. Preferably, the OBT uses an improved communications protocol selection such as, for example, one of the protocols described in detail in Applicant's U.S. Pat. No. 6,701,233.

If the vehicle is on the "exceptions list" at block 334, the OBT uses the protocol associated with that vehicle, or type of vehicle, to link to the vehicle. The communications protocol may be obtained from the host computer that is linked to the OBT. Optionally the communications protocol may be obtained from an input, such as, for example, an up key, down key or star key located on the OBT. Still optionally, the communications protocol may be stored in the OBT. Upon receiving the preferred communications protocol or associated communications protocol, the OBT establishes a communications link with the vehicle using the preferred communications protocol, and continues the test.

Figure 5:
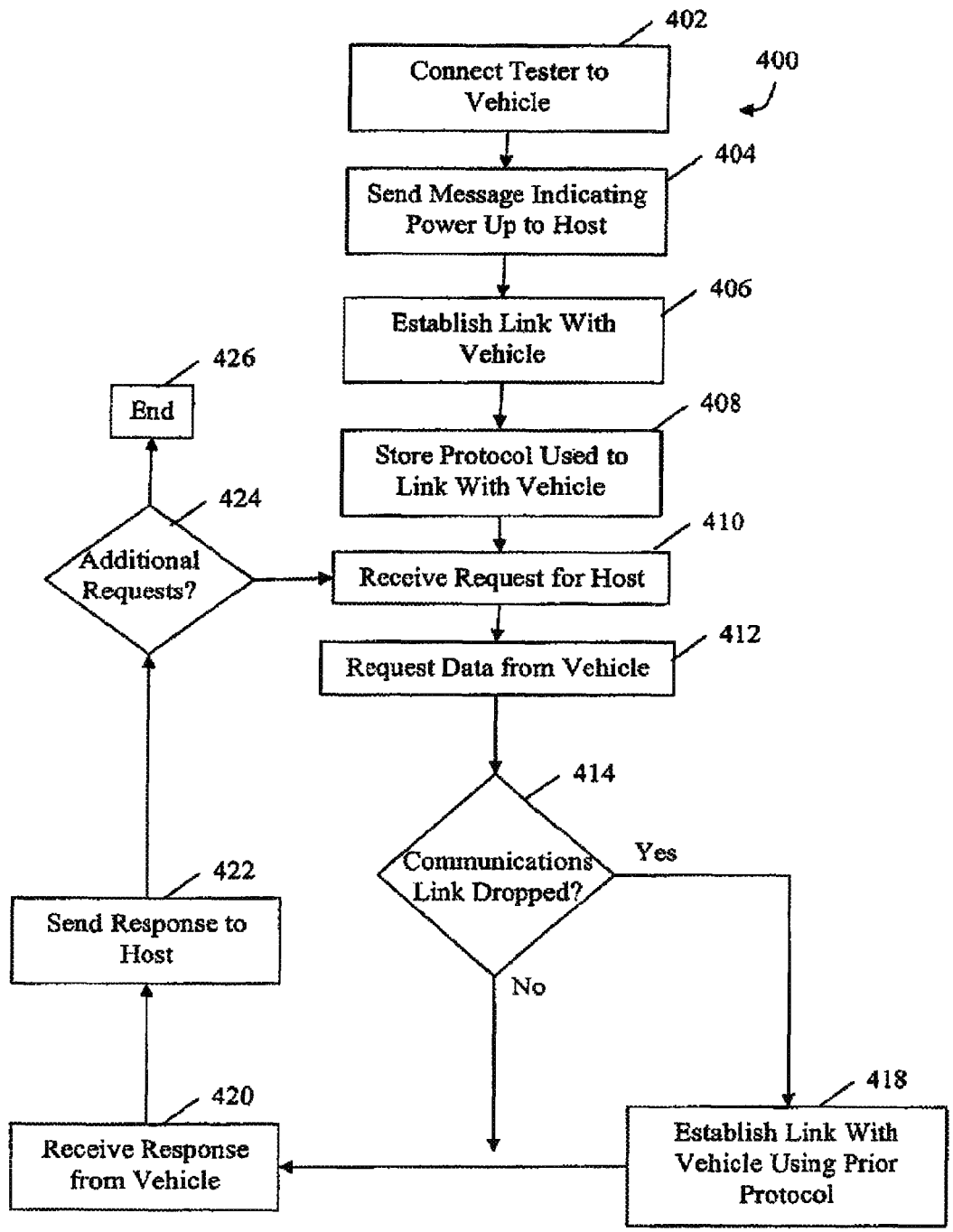

FIG. 5 illustrates an exemplary methodology of re-establishing a communications link upon detection of the loss of the communications link. The OBT is connected to the vehicle at block 402. Upon connection to the vehicle, the OBT powers up and preferably checks the voltage. The OBT sends a message to the host computer that the OBT recently powered up at block 404. Preferably, the message is a unique message indicating the OBT powered up and can be used as a means to prevent a user from falsifying an emissions test by connecting the OBT to one vehicle to start the test and moving the OBT to a second vehicle to finish the test. At block 406, the OBT determines the proper communications protocol and establishes a communications link with the vehicle. The communications link can be established in any manner, such as, those described above. At block 408, the communications protocol that was used to establish the communications link is stored in memory that is located in the host computer. Optionally, and/or additionally, the communications protocol is stored in the memory of the OBT. If the communications protocol is stored in the memory of the OBT, it is preferably stored in non-volatile memory if the OBT is powered from the vehicle's battery.

The OBT receives a request for vehicle data from the host computer at block 410, and requests the data from the vehicle at block 412. The host computer may transmit the communications protocol that the OBT used to initially connect to the vehicle along with the data requests. At block 414 the OBT determines whether the communications link has been dropped. The determination can be made by, for example, waiting for a specified time for the request for data. Preferably, the OBT uses the dropped communications detection disclosed in Applicant's U.S. Pat. No. 6,701,233. If the communications link has not been dropped, the OBT receives a response from the vehicle at block 420. If the communications link has been dropped, the OBT re-establishes the communications link using the previously used communications protocol at block 418. As noted above, the communications protocol may have been transmitted along with the data request, optionally, however the OBT retrieves the prior communications protocol that was used to establish communications with the vehicle. The OBT may retrieve the communications protocol from the host computer, or optionally may retrieve the prior communications protocol from its own memory.

At block 420, the OBT receives a response from the vehicle and at block 422 the OBT communicates the response to the host computer. A determination is made whether there are additional requests at block 424. If there are additional requests, the methodology proceeds to block 410 where the OBT receives another request from the host computer. If there are no additional requests, the methodology ends at block 426.

Figure 6:
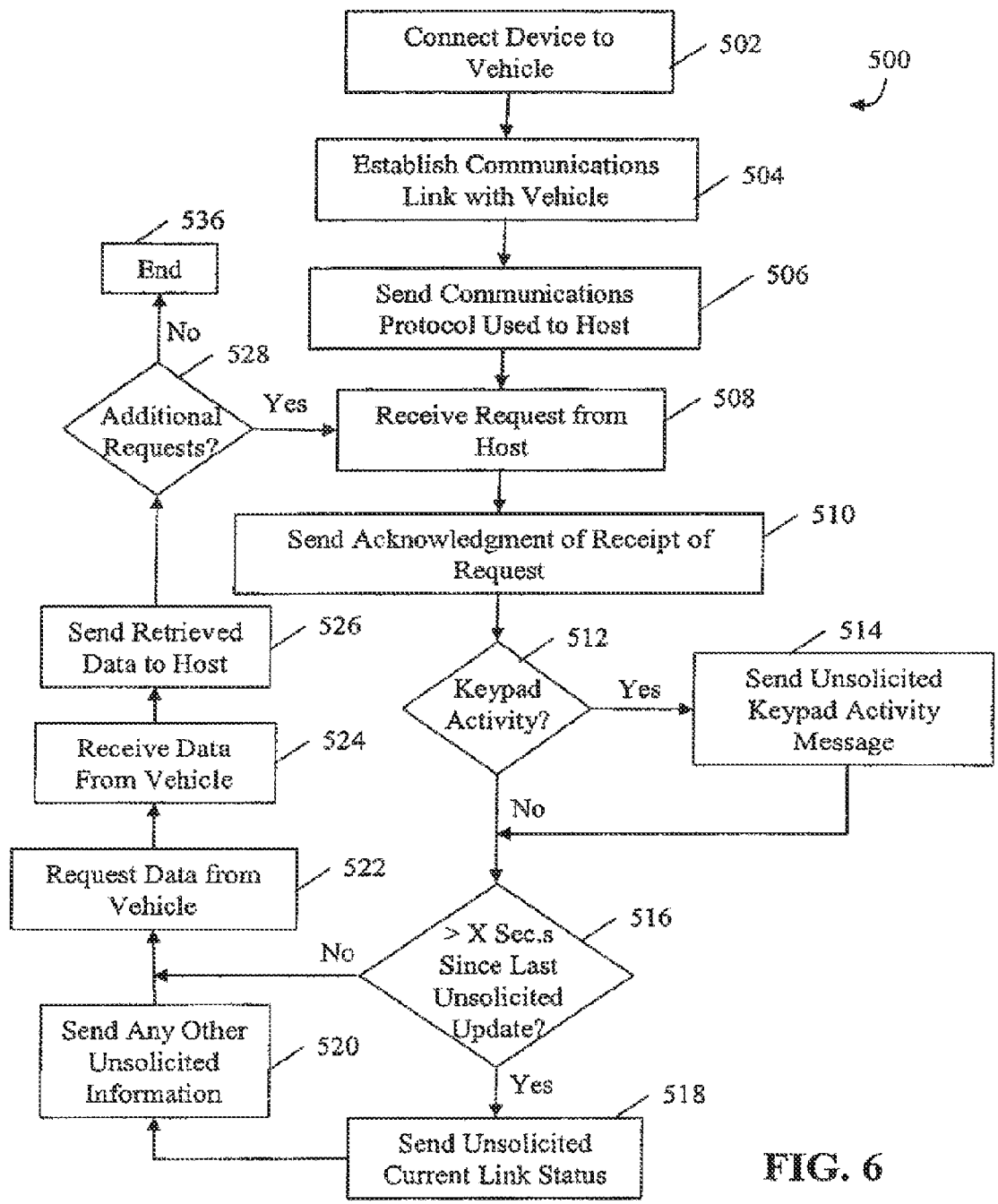

FIG. 6 illustrates an exemplary methodology for informing the host computer as to the progress of requests that may take significant amounts of time and/or changes in status of the system. An exemplary embodiment includes providing unsolicited messages to the host computer. Unsolicited messages are messages communicated to the host computer that are not in direct response to requests made by the host computer, such as for example, indicating any one or more of the following: the communications protocol that the OBT linked to the vehicle with, keypad activity, current link status, status of any currently executing command, acknowledgement of request, completion of requested command and OBT removal from vehicle.

In the exemplary methodology shown in FIG. 6, the OBT sends unsolicited messages to the host computer that are indicative of the communications protocol used to link with the vehicle, acknowledgement of request from host computer, keypad activity, and current link status. The unsolicited messages are a means for keeping the host computer informed as to the progress of requests that may take significant amounts of time and/or changes in status of the system. The OBT is connected to the vehicle at block 502 as discussed above, such as, for example, through an OBT connector. The OBT establishes a communications link with the vehicle at block 504, as described above. At block 506, the OBT sends an unsolicited message to the host computer. The unsolicited message may be indicative of the communications protocol that was used to link to the vehicle. Preferably, the communication protocol is stored in the host computer. At block 508 the OBT receives a request from the host computer. The request can be any request, such as, for example, a Mode 9 PID 0 request. At block 510 the OBT sends a response to the host acknowledging receipt of the request. The message may be a positive acknowledgement, such as, for example, that the OBT will comply, or a negative acknowledgement, such as, for example, the command is improperly formatted, or the OBT is busy. This releases the host computer to perform other tasks while the requested action is performed. Later, when the request has been acted on, an unsolicited message will be sent, indicated success or failure of the requested action. A determination is made whether there has been any un-reported keypad activity at block 512. If there has been un-reported keypad activity, the OBT sends an unsolicited message that there has been keypad activity at block 514. At block 516 a determination is made as to whether the amount of time since the last communications to the host computer, or the amount of time since the last unsolicited message was sent to the host computer. If the determined time exceeds a predetermined time threshold, an unsolicited current link status is sent to the host computer at block 518 and proceeds to block 520. At block 520, any additional unsolicited information is sent to the host computer, such as for example, all or a portion of the VIN number, is sent to the host computer as a means to check that the OBT is still connected to the correct vehicle, i.e., the vehicle that the test originated on. One or more of these types of unsolicited messages or other types of unsolicited messages can be removed or added. At block 522 the OBT requests the data from the vehicle diagnostic system. At block 524 the OBT receives the requested data from the vehicle diagnostic system and sends the requested data to the host at block 526. At block 528 a determination is made whether there are any additional requests from the host computer. The determination can be made by, for example, having the host computer signal the end of the test or waiting for a specified period of time to receive another request from the host computer. If there are additional requests, the methodology loops to block 508 where the OBT receives the request for additional data. If there are no additional requests, the methodology ends at block 536. The unsolicited messages can be used for a variety of things, such as, re-establishing a communications link, letting the host know that an action is being carried out, providing feedback, etc.

Figure 7:
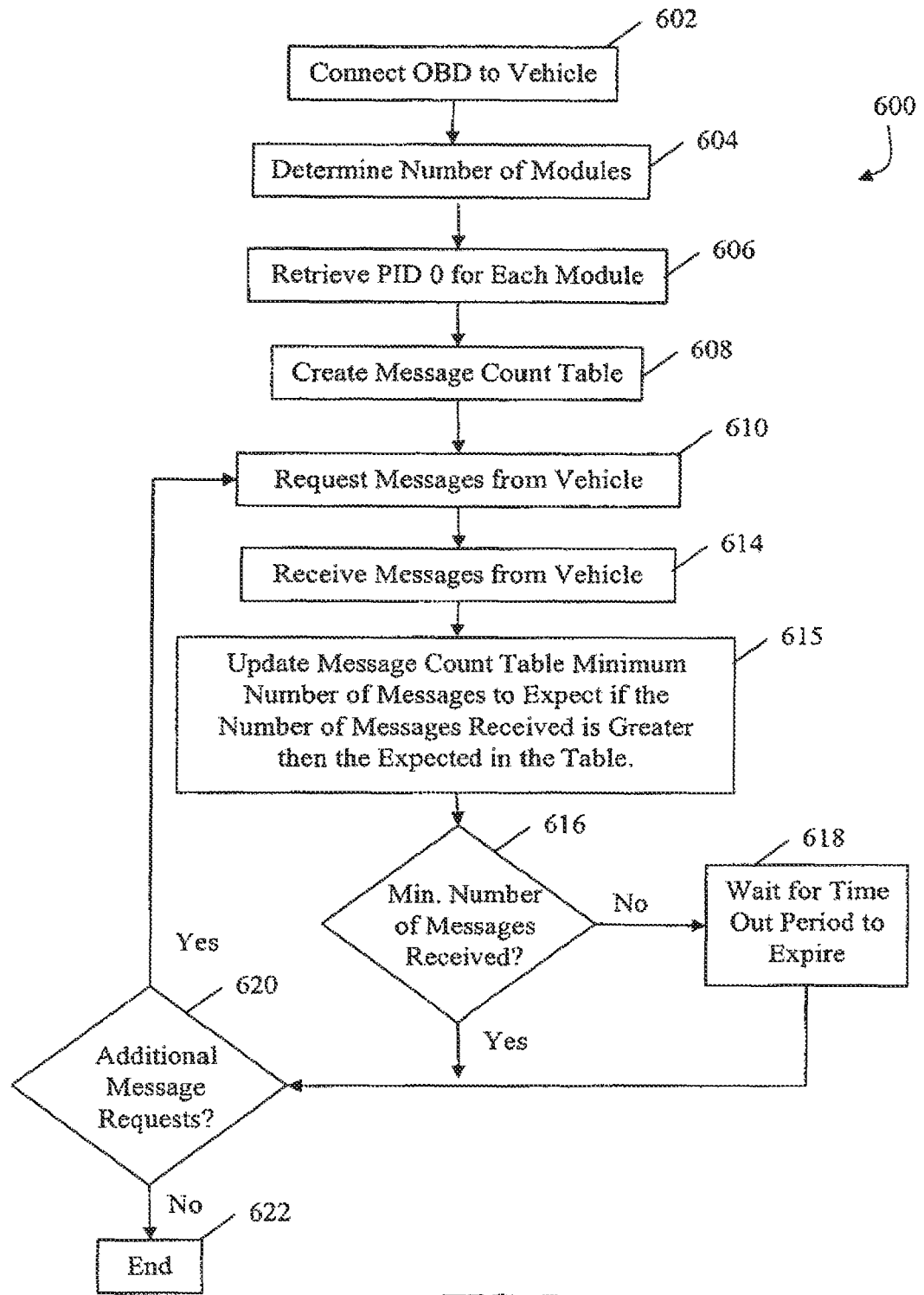

FIG. 7 illustrates an exemplary methodology for determining the time period that an OBT should wait after requesting information from a vehicle diagnostic system so that the OBT obtains all of the requested information from all of the modules that support the request but does not waste time waiting for time out periods to expire. In this exemplary methodology, the OBT creates a table indicating the number of computer modules, whether the computer module supports the requested data, and how many messages the OBT should expect and wait for from each module before continuing on without waiting for additional responses or waiting for time out periods to expire.

This exemplary methodology is illustrated using a Mode 09 request for vehicles using the following protocols: SAE J1850, ISO 9141-2 and ISO 14230-4; however, the methodology is equally applicable to other requests made by the OBT. Mode 09, requests for messages relating to vehicle information include, for example: 1) Vehicle identification Number (VIN), 2) Calibration IDs, 3) Calibration Verification Numbers (CVNs) and 4) In-Use Performance Data. Each vehicle has only one VIN number and the VIN number is generally only supported by one computer module, such as, for example the engine control module (ECM). The considerable length of the VIN number requires 5 messages to report the full VIN number for each vehicle. Waiting for time out periods for the other computer module to respond to the request is a waste of time. Identifying the correct number of Calibration IDs and CVNs also aids in reducing the time wasted waiting for time out periods to expire. The vehicle diagnostic system has one or more computer modules and each computer module has one or more calibration IDs. There is a CVN for each of the Calibration IDs.

The exemplary methodology below provides a system for determining the number of messages that an OBT should expect from each module, before proceeding. The exemplary methodology allows the OBT to proceed after it receives the expected number of messages from each module, and thereby allows the OBT to proceed without the need to wait for the time out periods to expire. Thus, the methodology reduces the time required to perform the diagnostic test.

In the exemplary methodology 600, the OBT is connected to the vehicle at block 602. At block 604, the ORT determines the number of computer modules that make up the on-board vehicle diagnostic system. This determination can be made by, for example, sending a Mode 01 PID 0 request to the vehicle diagnostic system. Since all of the computer modules will respond to a Mode 01 PID 0 request, the OBT can identify the number of computer modules in the vehicle diagnostic system. The OBT initiates a Mode 09 PID 0 request from the vehicle diagnostic system at block 606. At block 608, a message count table is created such as, for example. Table 1 below. Preferably the message count table includes the number of computer modules e.g., by including one row or column for each computer module. For example, if the number of computer modules is 4, the table may include module 0 through module 3, as shown below.

TABLE I

Mode 09-Message Count Table

| Module | PID 1 | PID 2 (×5) | PID 3 | PID 4 (×4) | PID 5 | PID 6 | PID 7 | PID 8 |
|---|---|---|---|---|---|---|---|---|
| 0 | 1 | 5 | 1 | 4 | 0 | 0 | 0 | 0 |
| 1 | 0 | 0 | 1 | 4 | 1 | 1 | 0 | 0 |
| 2 | 0 | 0 | 1 | 4 | 1 | 1 | 0 | 0 |
| 3 | 0 | 0 | 1 | 4 | 1 | 1 | 0 | 0 |

The initial entries for the message count table are created from the response to the mode 9, PID 0 request. Each bit in this response indicates whether the module sending the response supports a particular PID. The PIDs themselves are divided into pairs with the odd PID of the pair indicating the number of responses that the module will send in response to the even PID in the pair. Only a single message can be expected from any of the odd PIDs, while in the case of the even PIDs, multiple messages can be sent. PID 2 returns the Vehicle Identification number (VIN) which takes 5 message to report. PID 4 returns calibration IDs from the module, each of which takes four messages to report. The number of messages expected in response to a Mode 9, PID 4 request would always be a multiple of 4. For example, the tool sends a Mode 9, PID 0 request and module 0 responds with a 11110000 in the data section of the response. This would indicate support for PIDs 1, 2, 3, and 4, but no support for any other PIDs. The expected message count table for this module will be initially filled in as follows: PIDs 1 and 3 will be set to one as there is always only one response from a module in response to an odd PID. PID 2 will be set to 5 as this is the minimum number of messages required to report a VIN. PID 4 will be set to 4 as this is the minimum number of messages required to report a calibration ID. The rest of the table will be set to 0 as no other PIDs are supported. Similarly, if modules 1 through 3 respond to the same Mode 9 PID 0 request with 00111100, the table is filled is accordingly as illustrated in Table 1.

The message count table is used to determine whether the OBT should expect a response from a particular module and the number of messages that the OBT should expect. Using the message count table, if the OBT initiates a Mode 09, PID 1 request, for example, the ORT will expect a response from Module 0, and at least 5 messages from Module 0 and thus will wait until the OBT receives all 5 messages, or the required time out period expires.

Referring back to FIG. 7, at block 610 the OBT issues a request to the vehicle diagnostic system, such as, for example, a Mode 09 PID 01 request. The OBT receives messages from the vehicle at block 614. As noted above, often times the response to the PID 0 request misreported, or not accurate. Thus, if the response to the Mode 09, PID 1 request reports that more messages should be expected from PID 2, such as, for example, 10 messages instead of the 5 that the OBT expects, the OBT updates the table (as shown in Table II below) at block 615.

TABLE II

Mode 09-Message Count Table

| Module | PID 1 | PID 2 (×5) | PID 3 | PID 4 (×4) | PID 5 | PID 6 | PID 7 | PID 8 |
|---|---|---|---|---|---|---|---|---|
| 0 | 1 | 10 | 1 | 4 | 0 | 0 | 0 | 0 |
| 1 | 0 | 0 | 1 | 12 | 1 | 1 | 0 | 0 |
| 2 | 0 | 0 | 1 | 4 | 1 | 1 | 0 | 0 |
| 3 | 0 | 0 | 1 | 4 | 1 | 1 | 0 | 0 |

Similarly, if the OBT initiates a Mode 09 PID 3 request, the OBT expects a response from Module 0, Module 1, Module 2, and Module 3. The OBT further expects 16 messages, i.e. 4 from each module. As noted above, the computer modules often miss-report the number of messages to expect in response to the PID 0 request. Thus, if Module 1 responds with 12 messages, instead of the reported 4 messages, the OBT updates the message count table to reflect 12 messages from Module 1 at block 615. Often other OBTs are fooled by this type of response because they are expecting 16 total messages, and if they receive 4 messages from Module 0 and 12 messages from Module 1, they assume that all of the messages have been received and often proceed to initiate a new request before waiting for the time out period to expire, and therefore do not receive all of the data. Identifying the minimum number of messages that the OBT should expect from each module for one or more requests, allows the OBT to save time by allowing it to move on to the next request only after it receives the minimum number of messages from each module without having to wait for the time out periods to expire and without proceeding to initiate a request before all of the modules have responded.

The OBT keeps track of the number of messages received and the modules from which the messages were received. At block 616 a determination is made whether the minimum number of messages have been received from each module. The OBT uses the updated message count table to determine if each module that supports a request has provided the minimum number of messages that are listed in the table that corresponds to that request. If the minimum number of messages has not been received, the OBT waits until the remaining messages are received or the time out period expires at block 618. If at block 616 the minimum number of messages have been received the methodology proceeds to block 620 and a determination is made whether additional requests are to be made of the vehicle diagnostic system. If additional messages are to be requested, the methodology loops to block 610 and requests additional messages. If no additional messages are requested, the methodology ends at block 622.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art, for example, using fiber optic or wireless protocols. Therefore, the invention in its broader aspects is not limited to the specific details, representative apparatus and methods, and illustrative examples shown and described. Accordingly, departures may be made from such details without departing from the spirit or scope of the applicant's general inventive concept.

We claim:

1. An off-board device (OBT) comprising:
a processor in circuit communication with
a) a vehicle communication circuitry for linking to a vehicle diagnostic system, issuing one or more requests to the vehicle diagnostic system, and receiving one or more responses from the vehicle diagnostic system;
b) a host interface circuitry for communicating with a host computer;
c) a voltage determination circuitry for measuring a voltage through the vehicle diagnostic system connector; and
d) a memory.

2. The OBT of claim 1 further comprising logic for transmitting a message to the host computer indicative of a communications protocol used to link with a vehicle.

3. The OBT of claim 2 further comprising logic for receiving a message from the host computer indicative of the communications protocol used to link to the vehicle.

4. The OBT of claim 3 further comprising logic for re-establishing communications with the vehicle diagnostic system using the communications protocol that was used to link to the vehicle diagnostic system.

5. The OBT of claim 1 further comprising logic for linking to the vehicle diagnostic system using a communications protocol associated with a vehicle type, wherein the vehicle type is on a vehicle exceptions list.

6. The OBT of claim 5 wherein the vehicle exceptions list and associated communications protocol are received from the host computer.

7. The OBT of claim 5 wherein the vehicle exceptions list and associated communications protocol are stored in the OBT.

8. The OBT of claim 1 further comprising logic for diagnosing one or more components of the starting system.

9. The OBT of claim 1 further comprising logic for diagnosing one or more components of a charging system.

10. The OBT of claim 1 further comprising:
a housing;
a first connector in circuit communication with the vehicle connection circuitry and the voltage determination circuitry;
a second connector in circuit communication with the host interface circuitry;

a first cable for releasably connecting to the OBT and selectively placing the OBT in circuit communication with the vehicle diagnostic system; and a second cable for releasably connecting to the OBT and selectively placing the OBT in circuit communication with the host computer.

11. The OBT of claim 1 further comprising:

a housing;

a first connector in circuit communication with the vehicle connection circuitry and the voltage determination circuitry;

a first cable for releasably connecting to the OBT and selectively placing the OBT in circuit communication with the vehicle diagnostic system; and wireless communication circuitry for transmitting data to and receiving data from the host computer.

12. The OBT of claim 1 further comprising a display.

13. The OBT of claim 12 wherein the display comprises one or more LEDs.

14. The OBT of claim 13 wherein the one or more LEDs provides an output indicative of the status of one or more of the following: operator problem, vehicle problem, tool problem and tool functioning properly.

15. The OBT of claim 14 wherein the LEDs receive power from the host computer.

16. The OBT of claim 14 wherein the LEDs receive power from the vehicle.

17. The OBT of claim 14 wherein the LEDs receive power from the OBT.

18. An off-board device (OBT) comprising:

a processor in circuit communication with a) a vehicle communication circuitry for linking to a vehicle diagnostic system, requesting information from the vehicle diagnostic system, and receiving information from the vehicle diagnostic system;

b) a host interface circuitry for communicating with a host computer; and c) a logic for transmitting one or more unsolicited messages to the host computer.

19. The OBT of claim 18 wherein the one or more unsolicited messages include a message indicative of the communications protocol used to link to the vehicle diagnostic system.

20. The OBT of claim 18 wherein the one or more unsolicited messages include a message indicative of completion of a request and whether the request was successful.

21. The OBT of claim 18, wherein the processor is also in circuit communication with d) voltage determination circuitry for measuring a voltage through a vehicle diagnostic system connector.

* * * * *